US008621238B1

(12) United States Patent
Kimball

(10) Patent No.: US 8,621,238 B1
(45) Date of Patent: Dec. 31, 2013

(54) USING SOFTWARE-BASED DECISION PROCEDURES TO CONTROL INSTRUCTION-LEVEL EXECUTION

(75) Inventor: William B Kimball, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 54 days.

(21) Appl. No.: 13/190,520

(22) Filed: Jul. 26, 2011

(51) Int. Cl.
*G06F 11/30* (2006.01)
(52) U.S. Cl.
USPC ........... 713/189; 711/100; 711/154; 711/207; 712/228; 713/164; 713/166; 718/1; 718/102
(58) Field of Classification Search
USPC .......................................... 713/189; 712/228
See application file for complete search history.

(56) References Cited

U.S. PATENT DOCUMENTS

| | | | |
|---|---|---|---|
| 7,594,111 B2 | 9/2009 | Kiriansky et al. | |
| 7,603,704 B2 | 10/2009 | Bruening et al. | |
| 8,285,987 B1* | 10/2012 | Kimball et al. | 713/164 |
| 2004/0019891 A1* | 1/2004 | Koenen | 718/102 |
| 2006/0047958 A1* | 3/2006 | Morais | 713/166 |
| 2006/0259435 A1 | 11/2006 | Moritzen | |
| 2008/0005541 A1* | 1/2008 | Hase et al. | 712/228 |
| 2008/0178299 A1* | 7/2008 | Merkle et al. | 726/29 |
| 2008/0244573 A1* | 10/2008 | Sahita et al. | 718/1 |
| 2009/0113425 A1* | 4/2009 | Ports et al. | 718/1 |
| 2009/0172344 A1* | 7/2009 | Grochowski et al. | 711/207 |
| 2009/0300267 A1* | 12/2009 | Schneider | 711/100 |
| 2010/0161976 A1* | 6/2010 | Bacher | 713/164 |
| 2010/0162252 A1* | 6/2010 | Bacher | 718/102 |
| 2010/0169654 A1* | 7/2010 | Kiel et al. | 713/176 |
| 2010/0250870 A1* | 9/2010 | Vick et al. | 711/154 |
| 2011/0161620 A1* | 6/2011 | Kaminski et al. | 711/207 |
| 2012/0291126 A1* | 11/2012 | Lagar-Cavilla et al. | 726/22 |
| 2013/0019306 A1* | 1/2013 | Lagar-Cavilla et al. | 726/22 |

OTHER PUBLICATIONS

Kimball, William B, "SecureQEMU: Emulation-Based Software Protection Providing Encrypted Code Execution and Page Granularity Code Signing," Thesis, Air Force Institute of Technology, Wright-Patterson AFB OH, Deptartment of Electrical and Computer Engineering (2008).
Hinson, Joseph M., "Code White: A Signed Code Protection Mechanism for Smartphones," Thesis, Air Force Institute of Technology, Wright-Patterson AFB, OH, Department of Electrical and Computer Engineering (Sep. 2010).
Merritt, David T., "Spear Phishing Attack Detection," Thesis, Air Force Institute of Technology, Wright-Patterson AFB, Department of Electrical and Computer Engineering (Mar. 2011).

* cited by examiner

*Primary Examiner* — Linglan Edwards
*Assistant Examiner* — Gary Gracia
(74) *Attorney, Agent, or Firm* — AFMCLO/JAZ; Charles Figer, Jr.

(57) ABSTRACT

An apparatus, method and program product are provided for securing a computer system. A digital signature of an application is checked, which is loaded into a memory of the computer system configured to contain memory pages. In response to finding a valid digital signature, memory pages containing instructions of the application are set as executable and memory pages other than those containing instructions of the application are set as non-executable. Instructions in executable memory pages are executed. Instructions in non-executable memory pages are prevented from being executed. A page fault is generated in response to an attempt to execute an instruction in a non-executable memory page. In response to the page fault, an exception list of a sequence of instructions is checked for the attempted instruction in the non-executable memory page and if on the list, the page is set to executable and the attempted instruction executed.

15 Claims, 7 Drawing Sheets

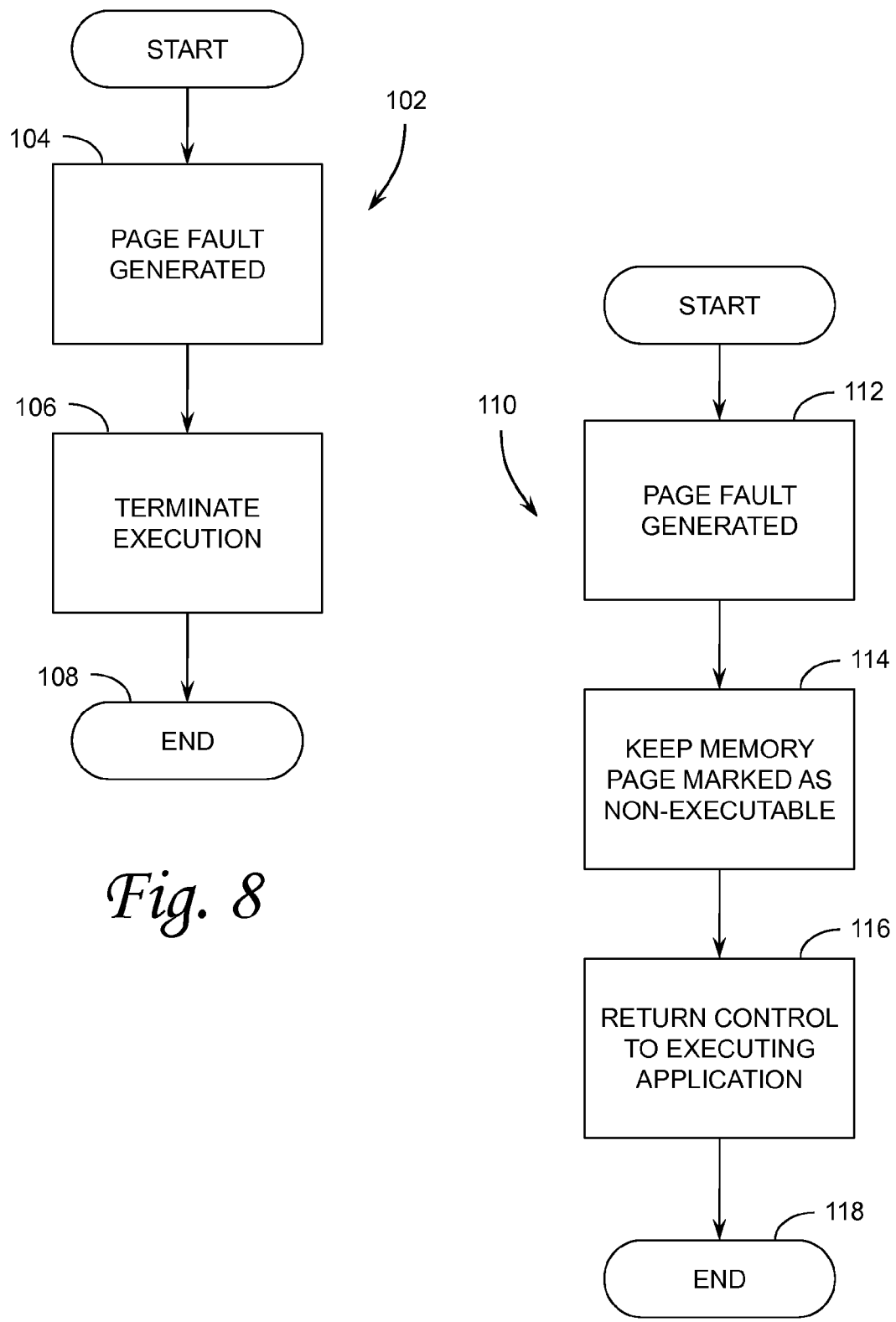

USING SOFTWARE-BASED DECISION PROCEDURES TO CONTROL INSTRUCTION-LEVEL EXECUTION

RIGHTS OF THE GOVERNMENT

The invention described herein may be manufactured and used by or for the Government of the United States for all governmental purposes without the payment of any royalty.

FIELD OF THE INVENTION

The present invention generally relates to securing computer systems, and more particularly, to defending a computer system against computer network attacks.

BACKGROUND OF THE INVENTION

Computer software is everywhere. It is used to operate our cars, our cellular phones, our televisions, and of course, our personal computers. The United States Environmental Protection Agency estimated that Americans collectively own over three billion electronic devices, many of which execute software to provide those capabilities upon which we have become increasingly dependent.

The increasing dependence on such electronic devices and the increasing prevalence of such devices creates vulnerabilities to our activities and lifestyles from attacks on these devices. Although software gives electronic devices many of the capabilities what we want and need, software also is a part of the vulnerability of many of these devices. The ramifications to individuals, companies, and society are grave if cell phones, vehicles, televisions, and other electronic devices fail to work properly or not at all. Such failures can affect our ability to get to work, pay our bills, or buy our food to cite just a few examples of the adverse consequences that could result from software exploitation of electronic devices. As computer software increases society's standard of living with respect to communication and convenience, this benefit alone warrants improved software security. However, a much greater need exists for software security.

Besides our personal lives, our national security depends on computer software. Power grids, financial systems, airlines, and virtually every defense system use software. These systems are also vulnerable to attack at many levels, including their software. The damage from a successful attack on any of these systems could be incalculable. If a software vulnerability led to a crash of the stock market or erasure and destruction of bank accounts and financial records, the financial system could be thrown into chaos. If our adversaries could control our defense systems, our national defense would be jeopardized. These examples illustrate the grave risks arising from software vulnerability and exploitation. There are many other scenarios where an attack on computer software would result in severe loss for the country because software security crosses all physical domains of land, sea, air, and space.

Software security experts attribute the growth and evolution of software vulnerability to connectivity, extensibility, and complexity. These characteristics often result in design and implementation errors that are vulnerable to attack. In turn, these vulnerabilities result in the development of malicious code (malware) such as worms, viruses, backdoors, and rootkits designed to exploit these vulnerabilities. The number of vulnerabilities reported each year by the Computer Emergence Response Team has increased from less than 300 in 1995 to more than 8,000 in 2006 and more than 7,000 in 2007.

The increased connectivity of computers and networks give would-be attackers the ability to attack systems independent of their geological location. For example, the Internet provides connectivity to banks and airline systems. Power grids are interconnected by supervisory control and data acquisition (SCADA) systems. Business use online web services, such as email, instant messaging, and advertising. Increased system connectivity increases exposure, and thus an attack surface.

Connectivity exists in both virtual and physical domains. A virtually closed system (local connectivity only) may also not be secure because access to the system's physical hardware could result in a compromise. Furthermore, an attacker could gain access to a closed system by blackmailing or impersonating a legitimate user of the system.

Extensibility is another major factor to consider when securing computer software. In computer software, extensibility is a design principle that incorporates the ability for software to grow. Software is developed to fill a need, but that need changes constantly. Major operation systems such as WINDOWS®, LINUX®, and BSD®, were designed to be updated. Newer versions of operation systems are constantly being released and each release adds new vulnerabilities. Even when cryptographic signing, it is not always possible to determine if an update or extension to a system is malicious.

Complexity is a third major factor that affects software security. Software complexity is often measured in lines of code. The more lines of code in a program, the more potential vulnerabilities exist. Microsoft WINDOWS® Vista alone consists of fifty million lines of code. Other WINDOWS® operating systems range in complexity from WINDOWS® 3.1 with around four million lines of code to WINDOWS® XP with forty million lines of code to WINDOWS® Vista and WINDOWS® 7 having approximately 50 million lines of code. Even if every vulnerability in an operating system was discovered and removed, applications and device drivers that run on those operating systems could contain errors that make the overall computer system and its software vulnerable to attack.

As a result of the vulnerability inherent in connectivity, extensibility, and complexity, attackers can gain access to, and maintain a presence within, computer systems using a wide variety of software exploits, backdoors, and rootkits. Although each of these techniques provides separate attack capabilities, almost all of these techniques execute malicious code. Malicious code also may be used as a means to thwart security mechanisms and exfiltrate confidential information from a system. A common thread of each of these schemes is that an attacker compromises a computer system by executing code within that system.

Connectivity, extensibility, and complexity also make it difficult to design and implement secure software. Consequently, detection and protection technologies have been developed. However, these technologies are ineffective in preventing all vulnerabilities within a software environment. As long as vulnerabilities can be exploited, as they currently can, there will be a need to improved software security.

Operating systems currently in use are designed for general purpose computing. For example, WINDOWS®, LINUX®, BSD®, SOLARIS®, and UNIX® operating systems help fulfill a variety of capabilities by allowing users to execute arbitrary code. Although most operating systems provide some security (separate user and kernel address space along with object access control, privileges, and the like), common attack techniques such as exploits, backdoors, and rootkits may execute in the user-space, at the least privileged level. This can occur because an attacker can execute arbitrary code, as well as a user. Furthermore, CPUs unremittingly execute code without knowing anything about its semantics. To provide better security within traditional operation systems, it is essential to control and limit the specific code executed on those operating systems.

One contemporary protection mechanism provides a signature-based blacklist approach to software protection. However, these types of protection mechanisms need to be updated frequently to recognize new threats. But, even then, specially crafted exploit payloads may bypass these protection mechanisms. Other contemporary protection mechanisms utilizing a whitelist approach to software protection, such as driver signing, overcome some of the drawbacks of blacklist approaches by executing signed code exclusively. Unsigned malicious code (exploits, backdoors, rootkits, etc.) remain unexecuted, therefore, protecting the system. However, these signing methods may still be prone to attack or their implementations may add unacceptable overhead to users.

Therefore, what is needed in the art is a protection mechanism implemented at lower (more "trusted") level of execution that does not add additional overhead.

SUMMARY OF THE INVENTION

Embodiments of the invention address the need in the art by providing an apparatus, method, and program product for a computer system. Prior to execution, applications are digitally signed within a trusted environment. These digital signatures (or HMACs), from here on referred to as "valid signatures", are introduced into the untrusted systems which are permitted to execute the applications. To execute each application requires loading their instructions into memory. When pages of memory are created by the operating system to store the application's instructions a signature of the code being loaded is computed and compared to the valid signatures. In response to finding a valid signature, memory pages containing instructions of the application are set as executable, while memory pages other than those containing instructions of the application are set as non-executable. Instructions in executable memory pages are allowed to execute and instructions in non-executable memory pages are prevented from executing.

In some embodiments, the digital signing of applications is performed by a trusted user of the computer system and these digital signatures may be stored in a protected area of the computer. The digital signing in some embodiments may utilize symmetric or asymmetric cryptographic algorithms, such as those found in computing HMACs or digital signatures within PKI, for example.

When there is an attempt to execute an instruction in a non-executable memory page, a page fault may be generated. In some embodiments, in response to the page fault, an exception list containing sequences of instructions may be checked for the attempted instruction in the non-executable memory page. If the attempted instruction is on the exception list, the non-executable memory page may then be set to an executable memory page and the attempted instruction may be executed. In some embodiments, in response to the page fault, the application may be terminated. In other embodiments, in response to the page fault, the non-executable memory page may be preserved as non-executable and control may then be returned to the application.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 8 is a flowchart illustrating an alternate sequence of steps consistent with embodiments of the invention after generation of a page fault in the flowchart in FIG. 5.

FIG. 9 is a flowchart illustrating another sequence of steps consistent with embodiments of the invention after generation of a page fault in the flowchart in FIG. 5.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Embodiments of the invention utilize a finer whitelist approach to defend against computer network attacks (CAN) in contrast to contemporary blacklist and other whitelist approaches. Grammar-based protections are the current state of the art blacklist approaches. In such a protection each grammar defines a list (language) of malicious (black) instructions and programs. Blacklist disadvantages include constant maintenance (updates), may result in false positives or false negative, and require resources (such as time, memory power, etc.) to search for the strings (signatures) within each grammar. Instead of maintaining a list of malicious instructions and programs, embodiments of the invention maintain a whitelist of approved instructions and programs. Furthermore, current whitelists are maintained at the file-level (EXEs, DLLs, etc.) and do not protect against intra-process attacks (such as leveraging memory corruption errors to execute malicious code). Embodiments of the invention whitelist the internals of programs either at the page or instructional level enabling the embodiments to detect and prevent a larger set of attack vectors, including memory-based attacks, than other contemporary whitelist approaches.

Figure 1:
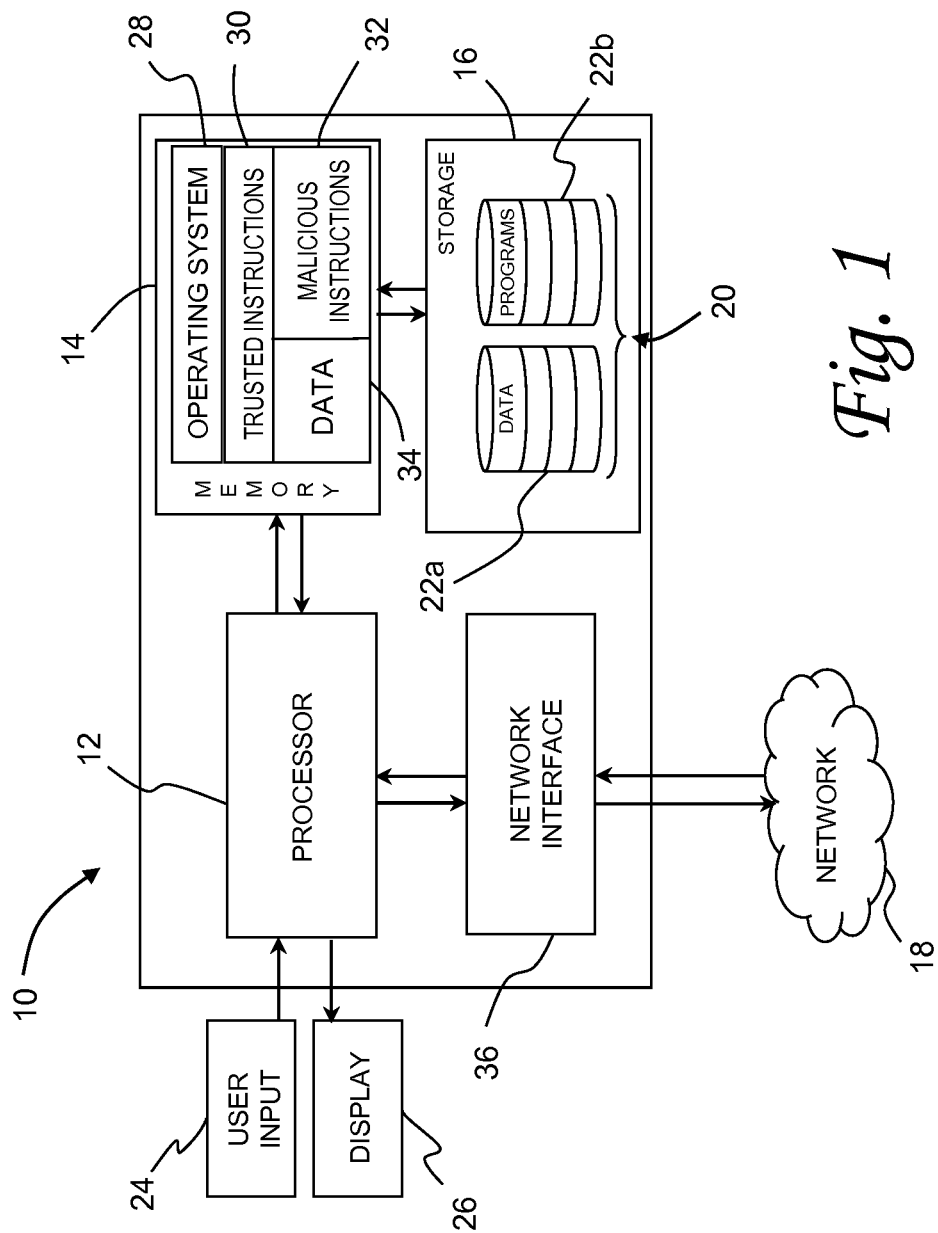
FIG. 1 is a diagrammatic illustration of a hardware and software environment for an apparatus configured to defend against computer network attacks consistent with embodiments of the invention.

Turning now to the drawings, wherein like numbers denote like parts throughout the several views, FIG. 1 illustrates an exemplary hardware and software environment for an apparatus 10 suitable defending against computer network attacks consistent with embodiments of the invention. For the purposes of the invention, apparatus 10 may represent practically any computer, computer system, or programmable device, e.g., multi-user or single-user computers, desktop computers, portable computers and devices, handheld devices, network devices, mobile phones, etc. Apparatus 10 will hereinafter be referred to as a "computer" although it should be appreciated that the term "apparatus" may also include other suitable programmable electronic devices.

Computer 10 typically includes at least one processor 12 coupled to a memory 14. Processor 12 may represent one or more processors (e.g. microprocessors), and memory 14 may represent the random access memory (RAM) devices comprising the main storage of computer 10, as well as any supplemental levels of memory, e.g., cache memories, non-volatile or backup memories (e.g. programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16 or another computer coupled to computer 10 via a network 18. The mass storage device 16 may contain a cache or other dataspace 20 which may store data 22a along with programs 22b or other instructions to be loaded into memory 14 for execution by the processor 12.

Computer 10 also typically receives a number of inputs and outputs for communicating information externally. For interface with a user or operator, computer 10 typically includes one or more user input devices 24 (e.g., a keyboard, a mouse, a trackball, a joystick, a touchpad, a keypad, a stylus, and/or a microphone, among others). Computer 10 may also include a display 26 (e.g., a CRT monitor, an LCD display panel, and/or a speaker, among others). The interface to computer 10 may also be through an external terminal connected directly or remotely to computer 10, or through another computer (not shown) communicating with computer 10 via a network 18, modem, or other type of communications device.

Computer 10 operates under the control of an operating system 28, and executes or otherwise relies upon various computer software applications, components, programs, objects, modules, data structures, etc. (e.g. trusted instructions 30 or malicious instructions 32). The trusted instructions 30, for example, may include programs 22b that are loaded into memory 14 for execution and are signed as set out in more detail below. Malicious instructions 32 may also include programs 22b loaded into memory 14 that are not signed and which should be prevented from executing utilizing embodiments of the invention. Additionally, data 34 may be loaded into memory and managed between the trusted 30 or malicious 32 instructions and the operating system 28. Computer 10 communicates on the network 18 through a network interface 36.

In general, the routines executed to implement the embodiments of the invention, whether implemented as part of an operating system or a specific application, component, program, object, module or sequence of instructions will be referred to herein as "computer program code", or simply "program code". The computer program code typically comprises one or more instructions that are resident at various times in various memory and storage devices in a computer, and that, when read ("fetched") and executed by one or more processors in a computer, causes that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in specific embodiments of the invention. However, it should be appreciated that any particular program nomenclature that follows is merely for convenience, and thus the invention should not be limited to use solely in any specific application identified and/or implied by such nomenclature. Furthermore, given the countably infinite number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2:
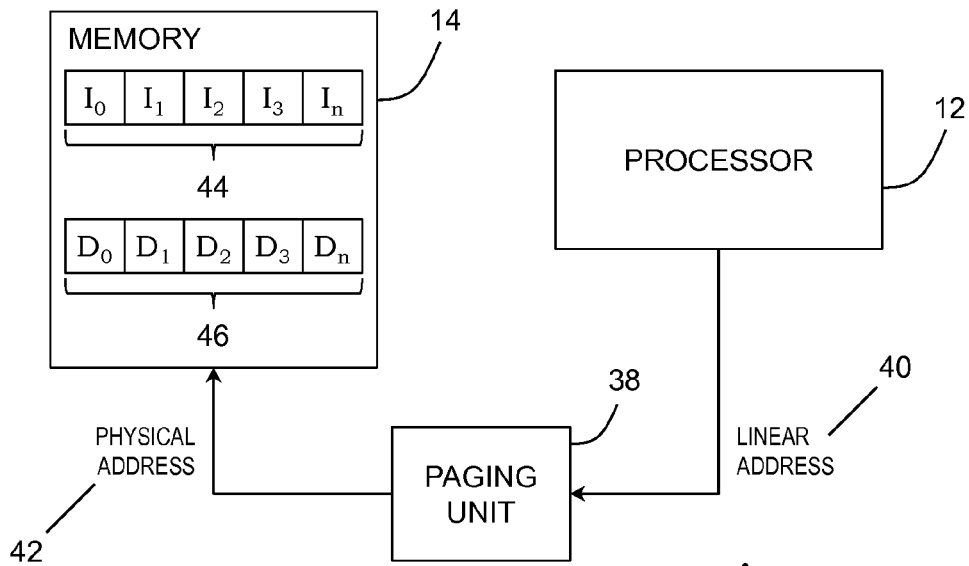
FIG. 2 is a diagrammatic illustration of a detailed portion of the hardware and software environment of FIG. 1.

A page, memory page, or virtual page is a fixed-length contiguous block of virtual memory that is the smallest unit of data for the following: memory allocation performed by the operating system 28 for a program; and transfer between main memory 14 and any other auxiliary store, such as mass storage device 16. The hardware and/or operating system 28 may load or swap pages from the auxiliary store to physical memory addresses in memory 14 automatically as needed. Turning now to FIG. 2, a paging unit 38 or other memory management unit translates linear memory addresses 40 from processor 12 to physical page addresses 42 such as page 44 containing a set of instructions or page 46 containing data.

The loader in contemporary operating systems may utilize Address Space Layout Randomization (ASLR), which is based on the assumption an attacker needs to know one or more addresses to control execution (such as in the case of control flow hijacking exploits). For example, an attacker attempting to take advantage of a stack-based buffer overflow needs to either know an address of the buffer to return into or an address of a jump instruction to return back into the buffer. If every module in the address space is loaded at unpredictable memory addresses then it is more difficult for the attacker to execute specific code which may result in a failed attack. In addition to this randomized layout, embodiments of the invention also rely on digital signatures of instructions at the page level, as set out in more detail below.

Figure 3:
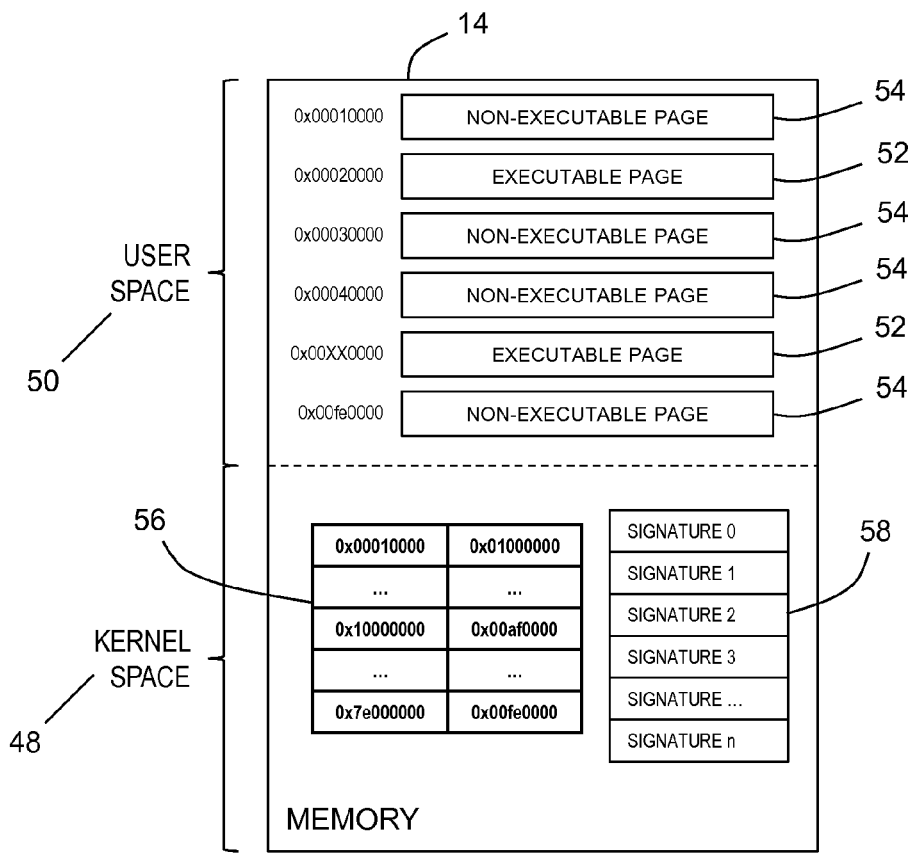
FIG. 3 is a diagrammatic illustration of a further detailed portion of the hardware and software environment of FIG. 1.

Further separation of pages may be accomplished by dividing usable memory into Kernel 48 and user 50 space as illustrated in FIG. 3. For example, Kernel space 48 may be the higher two gigabytes of a process's linear address space and user space 50 may be the lower two gigabytes, although other allocations for Kernel 48 and user 50 spaces may also be used. The user space 50 may contain the memory pages discussed above including instructions to be executed 44 and any data 46 related to those instructions. Memory pages in the user space 50 may be marked as executable memory pages 52 or non-executable pages 54 where execution of instructions in executable memory pages 52 is allowable and where attempted execution of instructions in non-executable memory pages 54 generates a page fault.

The Kernel space 48 may contain tables such as a page table 56 for mapping linear addresses from the processor 12 to physical locations in memory 14. The Kernel space 48 may also contain a table of digital signatures 58 which may be used by embodiments of the invention to identify trusted programs and/or instructions. The digital signatures may employ symmetric or asymmetric cryptography such as HMACs computed from pre-shared keys or digital signatures used within PKI, though other types of cryptography may also be used.

Figure 4:
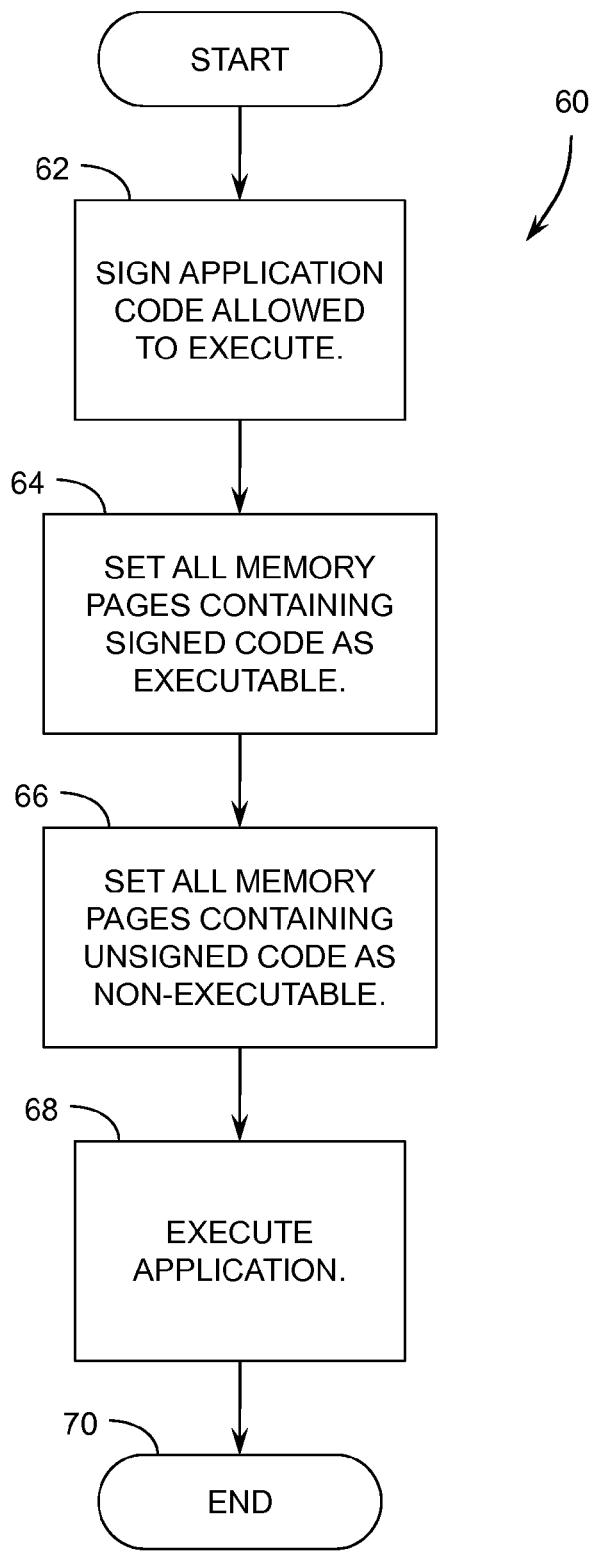
FIG. 4 is a flowchart illustrating a defense against computer network attacks consistent with embodiments of the invention.

In a particular embodiment illustrated in flowchart 60 in FIG. 4, an application code is signed by a trusted user at block 62. The application code signing may occur when the application is installed on the computer 10 or may be signed at a later time. The digital signature for the application code may then be stored in the digital signature table 58. When the signed application codes is loaded into memory 14, any memory pages containing the signed code instructions are set as executable memory pages 52 at block 64. Correspondingly, all other memory pages are set as non-executable memory pages 54 at block 66. The application code is then allowed to execute at block 68, with its instructions in the executable memory pages. Any instructions residing in a non-executable memory page 54 will not being allowed to execute. The process ends at block 70.

Figure 5:
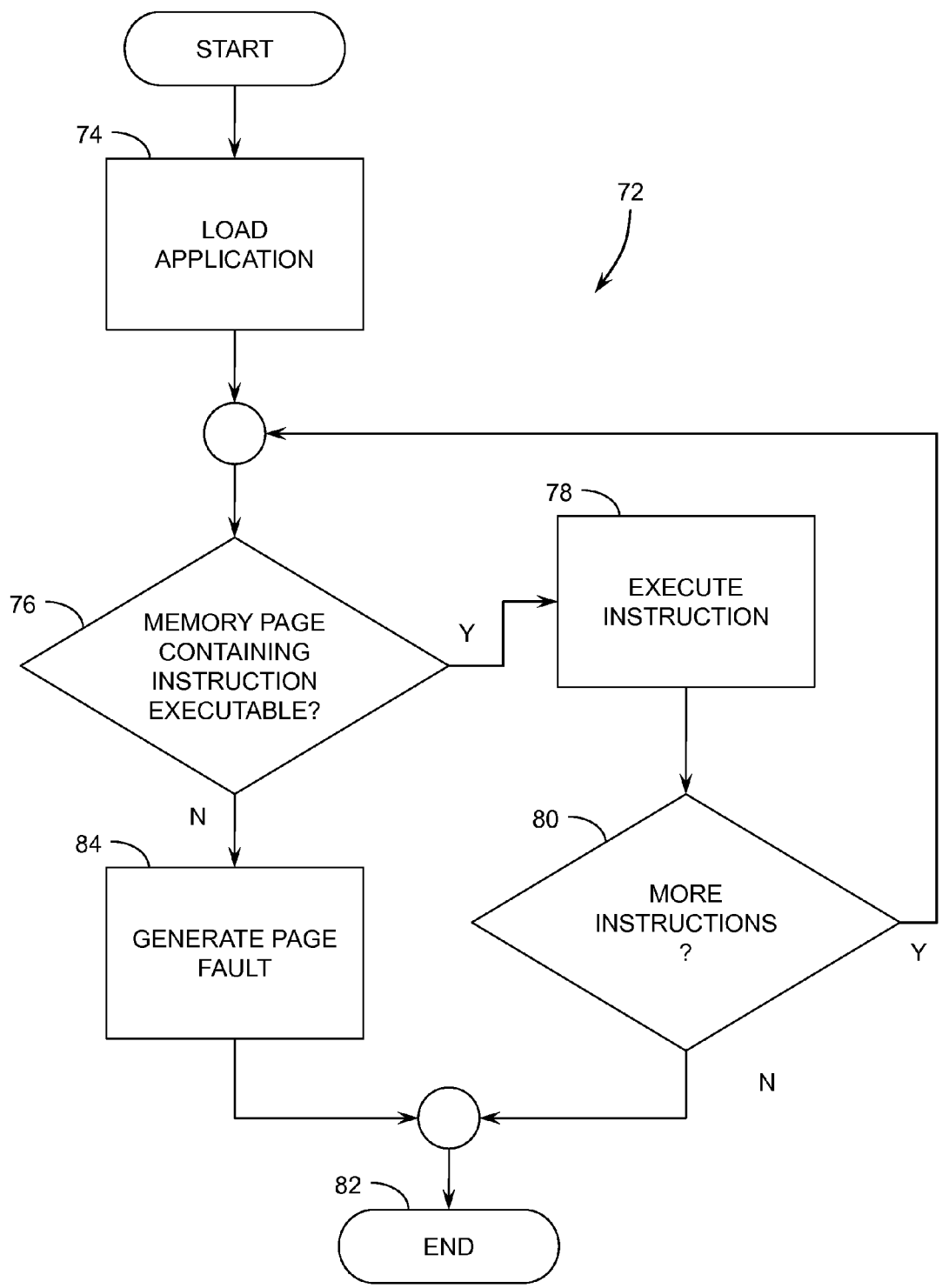
FIG. 5 is a flowchart illustrating an alternate defense against computer network attacks consistent with embodiments of the invention.

Flowchart 72 in FIG. 5 provides additional detail to the process in the embodiment above. The application is loaded into memory at block 74. As illustrated above in flowchart 60, memory pages are set to executable memory pages 52 if they contain signed instructions and non-executable memory pages 54 otherwise. Once loaded, a check is made to determine if the memory page is executable at decision block 76. If the page is set as executable ("Yes" branch of decision block 76), then the instruction is executed in block 78. If there are more instructions in the application ("Yes" branch of decision block 80), then the memory page for the next instruction is checked at block 76 and the process continues. Otherwise ("No" branch of decision block 80), the process ends at block 82. If, however, the memory pages is not set as executable ("No" branch of decision block 76), then a page fault is generated at block 84.

In some embodiments, memory pages may contain both instructions and data. These situations may commonly occur when executing self modifying applications, though there may be other situations where instructions and data share the same memory page. In these embodiments, the memory pages containing both instructions and data may initially be set as a non-executable memory page 54. After the signed application is loaded and the instruction only pages are set as executable memory pages 52, an instruction in one of the non-executable pages 54 at some point will attempt to be executed by the processor 12 resulting in a page fault as illustrated in the embodiment above.

Figure 6:
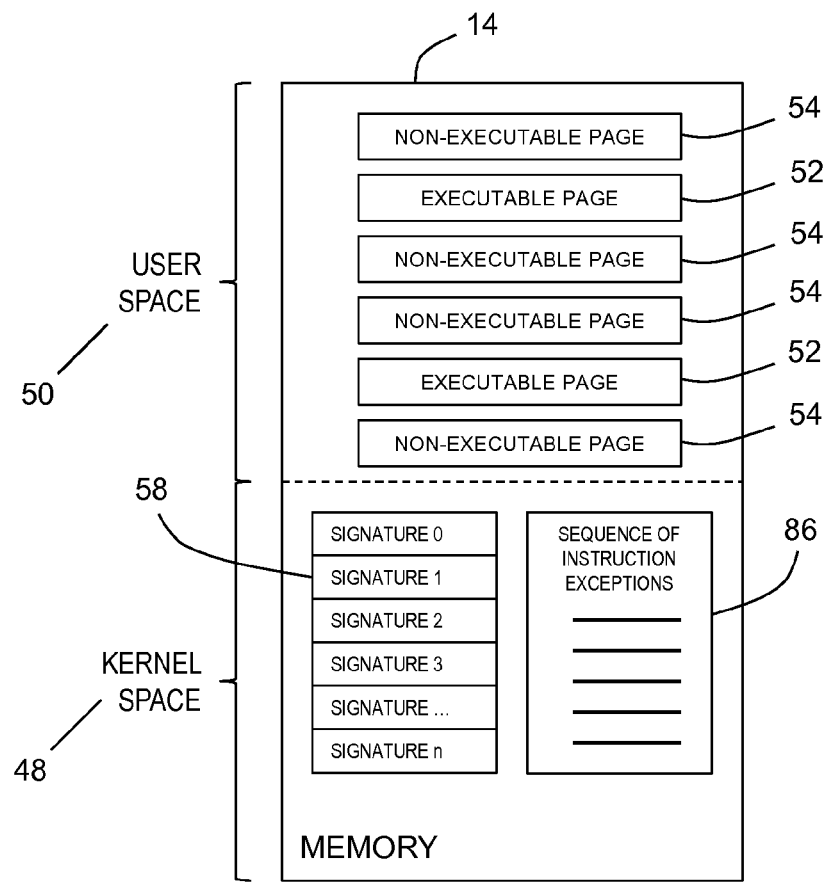
FIG. 6 is a diagrammatic illustration of the hardware and software environment of FIG. 3.
Figure 7:
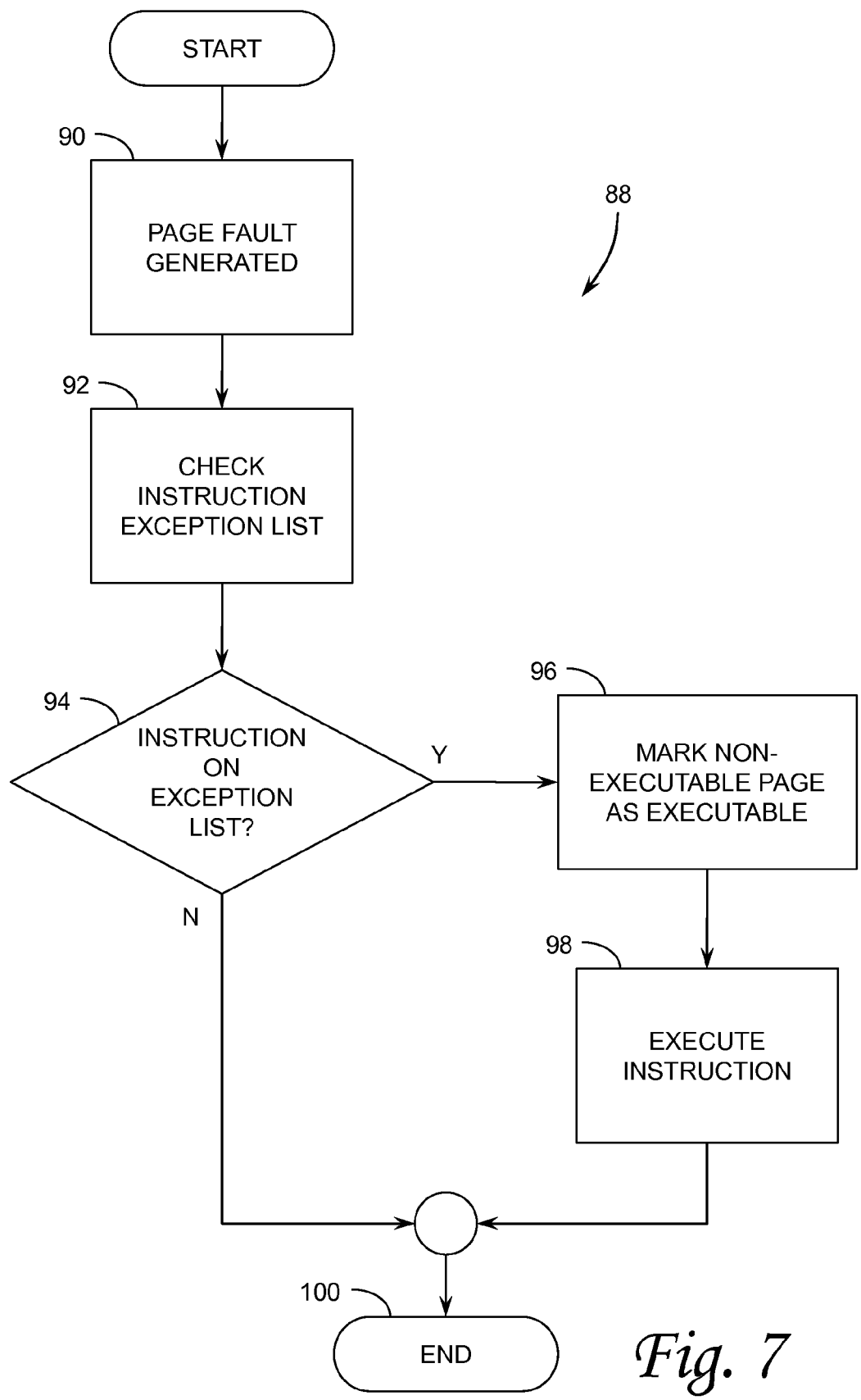
FIG. 7 is a flowchart illustrating a sequence of steps consistent with embodiments of the invention after generation of a page fault in the flowchart in FIG. 5.

At this point, a table containing a whitelist of exceptions 86 as seen in FIG. 6 may be consulted before further action is taken. This whitelist of exceptions table 86 may be stored in the Kernel space 48 similar to the table of digital signatures 58. This table may contain an approved list of sequences of instructions. Based on these approved sequences, a determination may be made regarding the execution or non-execution of the instruction. Flowchart 88 in FIG. 7 illustrates the steps that may be performed for this embodiment. After a page fault is generated (block 90) due to an attempt to execute an instruction residing in a non-executable memory page 54, a check of the whitelist table 86 of exceptions is checked at block 92. If the instruction is on the exception list ("Yes" branch of decision block 94), then the memory page is marked as executable at block 96 and the instruction is executed at block 98. At this point, any instruction residing on the memory page may now be executed due to the status change from non-executable to executable. If the instruction is not on the exception list ("No" branch of decision block 94), then the memory page is not modified and continues to be a non-executable memory page 54. The process ends at block 100.

Further action may be taken after a page fault is generated. For example, in some embodiments, as illustrated in flowchart 102 in FIG. 8, after a page fault is generated (block 104), execution of the application or program having the instruction which generated the page fault may be terminated in block 106. The process ends at block 108. Alternatively, in other embodiments and as illustrated flowchart 110 in FIG. 9, after a page fault is generate (block 112), the memory page remains marked as a non-executable memory page 54 in block 114. Control is then returned to the executing application at block 116 to allow the application to process the page fault and take further actions appropriate for that application. The process ends at block 118.

Figure 10:
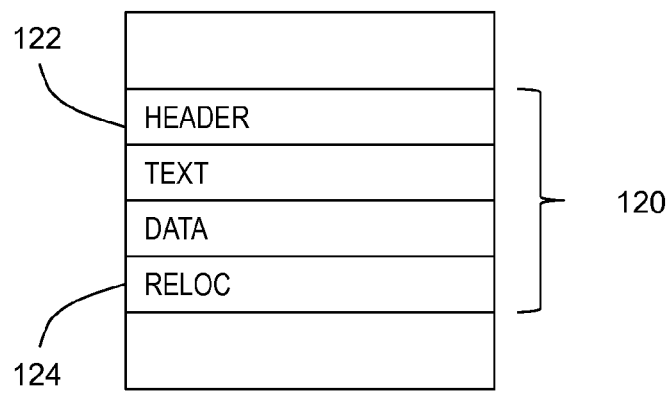
FIG. 10 is a diagrammatic illustration of an executable program that may be resident and/or executed on the hardware and software environment of FIG. 1.

When generating digital signatures for trusted applications, in some embodiments, part of the digital signature may include the physical address of the application being signed. When these applications are loaded into memory at locations other than their preferred addresses (i.e. relocated), the digital signatures may not match due to differences in absolute addresses used by the instructions of the application and those that are part of the signature. As such, and referring to FIG. 10, when an application 120 has been loaded into a memory location other than its preferred address, the preferred address from the header 122 and offsets in the reloc 124 portions of the application 120 may be used to back calculate absolute addresses used for digital signing and thus then be able to properly compare digital signatures to verify if the application is indeed a trusted application. Alternatively, the digital signature may be computed using the code of the application stored in 22b of data space 20 if a trusted mapping of the code in memory to the application exists.

While the present invention has been illustrated by a description of one or more embodiments thereof and while these embodiments have been described in considerable detail, they are not intended to restrict or in any way limit the scope of the appended claims to such detail. Embodiments of the invention utilize a whitelist approach to defend against computer network attacks in contrast to blacklist approaches. Instead of maintaining a list of malicious instructions and programs, which requires continual updates, the whitelist approach maintains a stable list of approved instructions and programs. The protection applied using the embodiments of this invention not only prevents the known blacklist of attacks from occurring but also defends against unknown attack. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method for securing a computer system, the method comprising:
checking a digital signature of an application to load into a memory of the computer system configured to contain memory pages;
in response to finding a valid digital signature:
setting a plurality of memory pages containing instructions of the application as executable; and
setting a plurality of memory pages other than those containing instructions of the application as non-executable;
executing instructions in the plurality of executable memory pages;
preventing execution of instructions in the plurality of non-executable memory pages; and
generating a page fault in response to an attempt to execute an instruction in a non-executable page of the plurality of non-executable memory pages,
wherein in response to the generation of the page fault:
checking a whitelist of a sequence of instructions for the attempted instruction in the non-executable page;
wherein the sequence of instructions is computer program code;
setting the non-executable memory page to an executable memory page if the attempted instruction is included in the whitelist; and
executing the attempted instruction in the executable memory page.

2. The method of claim 1, further comprising:
digitally signing the application by a trusted user of the computer system; and storing the digital signature for the application.

3. The method of claim 2, wherein the digitally signing utilizes cryptographic algorithms.

4. The method of claim 3, wherein the cryptographic algorithms are selected from a group consisting of: HMACs computed from pre-shared keys, digital signatures used within PKI, and combinations thereof.

5. The method of claim 1, wherein in response to the page fault:
terminating the application.

6. The method of claim 1, wherein in response to the page fault:
preserving the non-executable memory page as non-executable; and returning control to the application.

7. An apparatus comprising:
a memory configured to contain memory pages;
a processor;
and program code configured to be executed by the processor to secure a computer system, the program code further configured to check a digital signature of an application to load into memory;
in response to finding a valid digital signature:
set a plurality of memory pages containing instructions of the application as executable,
and set a plurality of memory pages other than those containing instructions of the application as non-executable; execute instructions in the plurality of executable memory pages;
prevent execution of instructions in the plurality of non-executable memory pages;
and generate a page fault in response to an attempt to execute an instruction in a non-executable memory page of the non-executable memory pages, wherein in response to the generation of the page fault the program code is further configured to:
check a whitelist of a sequence of instructions for the attempted instruction in the non-executable memory page;
wherein the sequence of instructions is computer program code;
set the non-executable memory page to an executable memory page if the attempted instruction is included in the whitelist;
and execute the attempted instruction in the executable memory page.

8. The apparatus of claim 7, wherein the program code is further configured to: allow a trusted user of the computer system to digitally sign the application; and store the digital signature for the application.

9. The apparatus of claim 8, wherein the digitally signing utilizes cryptographic algorithms.

10. The apparatus of claim 9, wherein the cryptographic algorithms are selected from a group consisting of: symmetric algorithms, asymmetric algorithms, and combinations thereof.

11. The apparatus of claim 7, wherein in response to the page fault, the program code is further configured to:
terminate the application.

12. The apparatus of claim 7, wherein in response to the page fault, the program code is further configured to:
preserve the non-executable memory page as non-executable; and return control to the application.

13. A program product comprising:
a non-transitory computer recordable type medium;
and a program code configured to secure a computer system, the program code resident on the computer recordable type medium and further configured, when executed on a hardware implemented processor, to check a digital signature of an application to load into memory;
in response to finding a valid digital signature:
set a plurality of memory pages containing instructions of the application as executable, and set a plurality of memory pages other than those containing instructions of the application as non-executable;
execute instructions in the plurality of executable memory pages;
prevent execution of instructions in the plurality of non-executable memory pages;
and generate a page fault in response to an attempt to execute an instruction in a non-executable memory page of the non-executable memory pages, wherein in response to the generation of the page fault the program code is further configured to:
check a whitelist of a sequence of instructions for the attempted instruction in the non-executable memory page;
wherein the sequence of instructions is computer program code;
set the non-executable memory page to an executable memory page if the attempted instruction is included in the whitelist; and execute the attempted instruction in the executable memory page.

14. The program product of claim 13, wherein in response to the page fault, the program code is further configured to:
terminate the application.

15. The program product of claim 13, wherein in response to the page fault, the program code is further configured to:

preserve the non-executable memory page as non-executable; and return control to the application.

* * * * *